Figure 3:
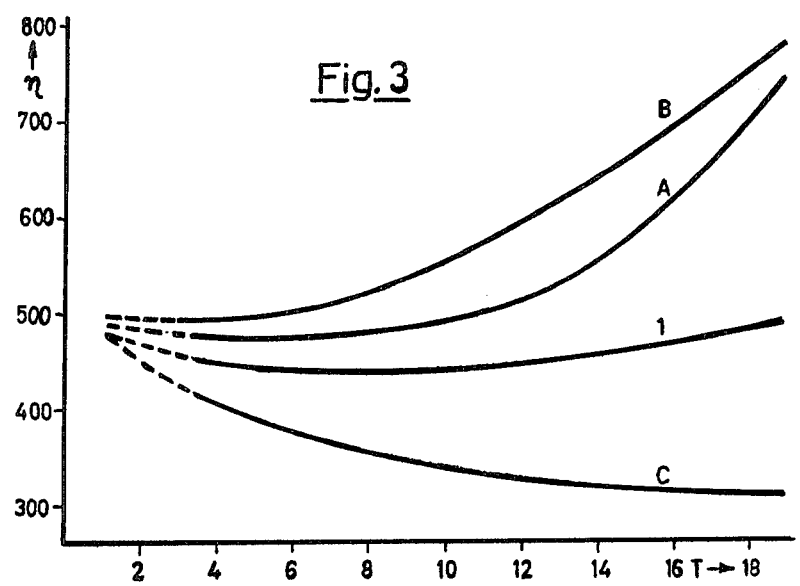

United States Patent [19]

Hartmann et al.

[11] 4,091,143

[45] May 23, 1978

[54] MAGNETIC RECORDING MEDIA

[75] Inventors: Hans Joerg Hartmann, Freinsheim; Guenter Vaeth, Limburgerhof; Helmut Kopke, Ludwigshafen, all of Germany

[73] Assignee: BASF Aktiengesellschaft, Ludwigshafen, Germany

[21] Appl. No.: 624,580

[22] Filed: Oct. 22, 1975

Related U.S. Application Data

[63] Continuation of Ser. No. 429,088, Dec. 28, 1973, abandoned.

[30] Foreign Application Priority Data

Jan. 2, 1973 Germany .............................. 2300020

[51] Int. Cl.² ............................................ H01F 10/02
[52] U.S. Cl. .................................. 428/328; 428/539; 428/900
[58] Field of Search ....................... 428/539, 900, 328; 427/127–132

[56] References Cited

U.S. PATENT DOCUMENTS

| | | | |
|---|---|---|---|
| 3,398,011 | 8/1968 | Neirotti et al. | 427/131 X |
| 3,484,268 | 12/1969 | Newman | 427/128 UX |
| 3,526,598 | 9/1970 | Lemke | 427/128 UX |
| 3,625,760 | 12/1971 | Slovinsky | 427/128 UX |
| 3,634,252 | 1/1972 | Graham | 427/128 UX |
| 3,649,541 | 3/1972 | Ingersoll | 427/128 UX |
| 3,819,411 | 6/1974 | Kitamoto et al. | 427/128 UX |

*Primary Examiner*—Bernard D. Pianalto
*Attorney, Agent, or Firm*—Keil, Thompson & Shurtleff

[57] ABSTRACT

Magnetic recording media, the magnetic coating of which consists of a dispersion of elongated ferromagnetic chromium dioxide particles in an organic binder, the dispersions exhibiting particularly good storage stability. This is achieved by admixing 0.5 to 6% by weight, based on the amount of chromium dioxide pigment, of the zinc salt of an aliphatic carboxylic acid of 8 to 18 carbon atoms, during the manufacture of the chromium dioxide dispersions. Chromium dioxide dispersions with good storage stability and a high degree of orientation of the elongated magnetic particles in the magnetic coating are thus obtained in a simple manner.

2 Claims, 4 Drawing Figures

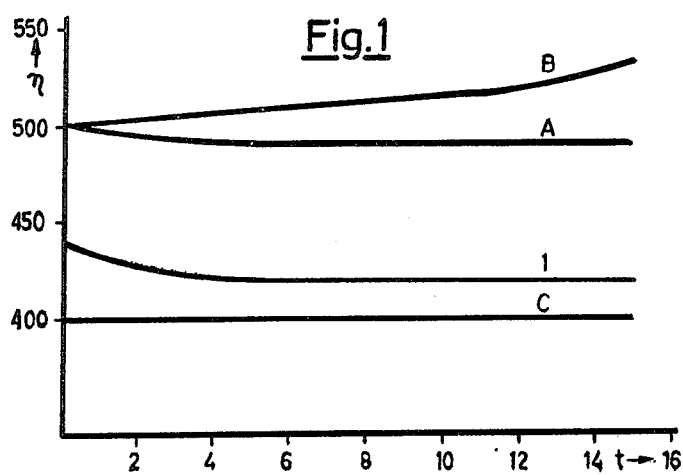
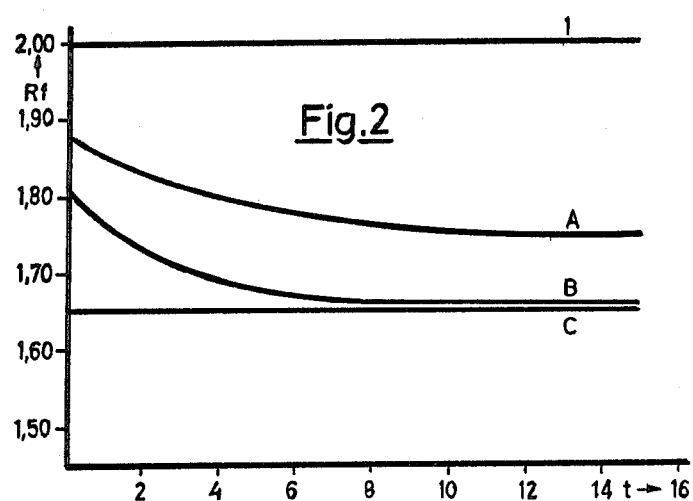

MAGNETIC RECORDING MEDIA

This is a continuation of application Ser. No. 429,088 filed Dec. 28, 1973, and now abandoned.

The present invention relates to a process for the production of magnetic recording media, wherein chromium dioxide magnetic pigment dispersions exhibiting particularly good storage stability are produced which after coating, orienting and drying give magnetic coatings with reproducible high orientation ratios.

Dispersions containing chromium dioxide as the magnetic pigment usually exhibit an increase in viscosity during processing, especially if the dispersions have been dispersed, or been left to stand, for a prolonged period, and this increase can have an extremely adverse effect on the processing characteristics of the dispersions. Magnetic pigments, such as gamma-iron (III) oxide of Co-Fe metal pigments do not exhibit this viscosity increase except as a result of the development of a structural viscosity and the evaporation of solvents when the dispersion is stored. The term "structural viscosity" means a reversible increase in viscosity which can be eliminated by vigorous stirring or other shearing forces, or by dilution. However, the increases in viscosity of the chromium dioxide dispersions are irreversible processes which cannot be reversed by the measures mentioned.

It is an object of the present invention to provide a suitable additive, for use in the manufacture of the chromium dioxide dispersions and the manufacture of the magnetic coatings therefrom, which substantially prevents the undesirable increase in viscosity of the dispersions, contributes to the achievement of high reproducible orientation ratios after the magnetic coating has been produced from the dispersions, and has no adverse effect on other important properties of the magnetic recording media.

We have found that this object is achieved and that the production of magnetic recording media having high orientation ratios the magnetic coating containing elongated ferromagnetic chromium dioxide particles dispersed in an organic binder, by dispersing the ferromagnetic chromium dioxide pigments in an organic polymeric binder in the presence of an organic solvent and coating, a base, orienting the longitudinal axes of the chromium dioxide particles in the playing direction and coating plane by applying a magnetic field, and drying the coated base can be advantageously carried out by adding 0.5 to 6, and especially 1 to 3, % by weight of the zinc salt of an aliphatic carboxylic acid of 8 to 18 carbon atoms during or after the manufacture of the chromium dioxide dispersion, in order to stabilize the latter and obtain magnetic coatings with high orientation ratios.

Of the zinc salts of the aliphatic linear and branched carboxylic acids of the above type, the zinc salts of stearic acid, isostearic acid and especially oleic acid have proved to be very suitable. These salts can be produced, for example, from the acids by reaction with zinc hydroxide or zinc oxide.

The chromium dioxide magnetic pigments which can be used are conventional elongated ferromagnetic chromium dioxide particles which have an average particle size of less than $2\mu$ and an average length to width ratio of at least 4:1 and in particular at least 5:1. The manufacture of suitable ferromagnetic chromium dioxide is described, for example, in U.S. Pat. Nos. 2,885,365, 2,923,683, 2,923,684, 2,923,685 and 3,034,988.

Conventional organic polymeric binders, especially the known synthetic organic binders, preferably in the form of their solutions, can be used as binders for the manufacture of the magnetic dispersion, in which the ratio of chromium dioxide to binder is usually 1 part by weight of chromium dioxide to 0.13–0.5, and preferably 0.17–0.3, part by weight of binder (dry weight). Vinyl chloride polymers and vinyl chloride copolymers, such as the partially hydrolyzed commercially available vinyl chloride/vinyl ester copolymers, styrene-butadiene copolymers, acrylic ester copolymers, polyvinyl acetals, synthetic polyamides and, preferably, binders wherein 50 to 100% by weight of the total amount of binder consists of polyurethane binders, may be mentioned as examples. Of the latter, elastomeric polyurethanes which are practically free of isocyanate groups especially elastomeric polyester urethanes, above all those mixed with polyvinyl acetals such as polyvinyl formals or vinyl chloride/vinyl acetate/vinyl alcohol copolymers, are particularly suitable. Suitable elastomeric polyester urethanes can be produced by reaction of polyester glycols, obtained from aliphatic dicarboxylic acids of 4 to 12 carbon atoms, aliphatic diols of 2 to 8 carbon atoms and optionally an aliphatic polyol of 4 to 16 carbon atoms, with an organic diisocyanate, such as 4,4'-diisocyanatediphenylmethane, and optionally an aliphatic diol of 2 to 8 carbon atoms, about 0.7 to 1.3 isocyanate groups being present per hydroxyl group.

Suitable organic solvents for the process of the invention are conventional solvents such as methyl ethyl ketone, tetrahydrofuran, 1,2-dichloroethane, 1,4-dioxane, benzene and toluene as well as mixtures of such solvents and similar solvents, provided the binders used are soluble therein.

Furthermore, conventional additives can also be added to the dispersions during or after their manufacture, for example dispersing agents such as aliphatic monocarboxylic acids of 8 to 22 carbon atoms and esters of aliphatic monocarboxylic or dicarboxylic acids with aliphatic alcohols, the esters having about 8 to 36 carbon atoms, lubricants such as commercially available silicone oil, and fillers such as silicates or conductive carbon and the like, in the conventional amounts which generally do not exceed 5% by weight of the amount of magnetic pigment. The addition of esters of aliphatic monocarboxylic and/or dicarboxylic acids with aliphatic alcohols which have a total of about 8 to 36 carbon atoms, and the addition of a small amount of a commercially available silicone oil, preferably about 0.2 to about 0.5% by weight of the amount of magnetic pigment, has proved of value.

Dispersion, i.e. the production of the coating mix from the magnetic pigment, binder and solvent, can be carried out conventionally by milling the components of the dispersion, for example, in a ball mill; the zinc salt can be added, according to the invention, before, during or after dispersion. As a rule, the dispersion is filtered after a sufficiently long milling period.

We have found that, surprisingly, dispersions to which zinc salt has been added, according to the invention, can be processed for more than 14 days in dispersing equipment without an appreciable rise in the viscosity of the dispersion. In addition, the dispersions display exceptional storage stability. No increase in viscosity—on the contrary, a slight decrease in viscosity—of the dispersion was detectable over 14 days if, before measuring the viscosity, the stored dispersion was briefly subjected to strong shearing forces, for example stirred for 5 minutes with an impeller to break down the structural viscosity. The shelf life of magnetic pigment dispersions is very important in industrial magnetic tape production since it is not always possible to use the magnetic dispersion immediately after its preparation, and losses can be avoided if the magnetic dispersion keeps well.

In general, as the viscosity of the magnetic pigment dispersions increases during storage, the orientability of the magnetic particles under the action of the orienting field or, in other words, the orientation ratio, i.e. the ratio of residual induction in the playing direction to that in the crosswise direction, decreases. Since a high orientation ratio results in a higher signal amplitude, it is very desirable that a magnetic tape should have a high orientation ratio.

Surprisingly, magnetic coatings produced in accordance with the invention have higher orientation ratios than coatings produced under identical conditions from dispersion containing no zinc salt.

The parts and percentages given in the following Examples and comparative experiments are by weight, unless stated otherwise. Parts by volume bear the same relation to parts as the liter to the kilogram. The K values were determined according to H. Fikentscher, Cellulosechemie 13, 60 (1932).

The viscosities of the chromium dioxide pigment dispersions, in centipoise (cp), were determined in a concentric cylinder viscometer. The orientation ratios (referred to in the Figures as $R_f$) were determined using a vibrating-sample magnetometer.

Example 1

40,000 Parts of steel balls, 5,400 parts of a ferromagnetic chromium dioxide pigment having an average particle size about 0.5μ and having a length to width ratio of 4:1 to 8:1, 135 parts of zinc oleate, 800 parts of a commercially available polyester urethane free of isocyanate groups, which is obtained from a polyester glycol (from adipic acid and 1,4-butanediol) and 4,4'-diisocyanato-diphenylmethane and has a K value of about 63 (measured in a 1% strength solution in tetrahydrofuran), and 400 parts of a polyvinyl formal binder (containing about 83% of vinyl formal units, about 12% of vinyl acetate units and about 5% of vinyl alcohol units and having a K value of about 65, measured in a 1% strength solution in tetrahydrofuran) and 14,000 parts of a mixture of equal parts of tetrahydrofuran and 1,4-dioxane are placed in a steel ball mill having a capacity 40,000 parts by volume, operated at about 50 revolutions per minute, the polyester urethane and polyvinyl formal being added in the form of a common solution in the abovementioned tetrahydrofuran/1,4-dioxane mixture. The entire mixture is dispersed for about 5 days in the ball mill until it is found that a coating obtained with a sample of the dispersion exhibits a sufficiently smooth surface. 108 Parts of n-butyl stearate, dissolved in 100 parts of the abovementioned tetrahydrofuran/dioxane mixture, is then added to the magnetic dispersion obtained and dispersion is continued for a further 2 hours. The magnetic dispersion obtained is then filtered through a cellulose/asbestos fiber filter layer.

Comparative Experiment A

A magnetic dispersion is prepared exactly as described in Example 1 except that 135 parts of commercial sodium oleate is used instead of 135 parts of zinc oleate.

Comparative Experiment B

A magnetic dispersion is prepared exactly as described in Example 1 except that 135 parts of commercial soya lecithin are used instead of 135 parts of zinc oleate.

Comparative Experiment C

A magnetic dispersion is prepared exactly as described in Example 1 except that 135 parts of commercial soya lecithin are used instead of 135 parts of zinc oleate, 5,400 parts of chromium dioxide magnetic pigment are replaced by 5,000 parts of gamma-iron-(III) oxide magnetic pigment of about the same particle size are used, and 400 parts of conductive carbon are added during dispersion to reduce the electrical resistance of the coating.

I. Influence of storage on the viscosity of the magnetic dispersions

The dispersions prepared according to Example 1 and Comparative Experiments A to C are taken from the ball mills and poured into storage tanks closed from the atmosphere and equipped with anchor stirrers, such as are conventionally used for storing magnetic dispersions, and held therein whilst being stirred. Samples of the dispersions are taken from the storage tanks immediately after their introduction and at intervals of two days, and their viscosities are determined in a concentric cylinder viscometer. FIG. 1 shows the variation in viscosity in centipoise, of the various dispersions, as a function of the storage time t, in days. It is found that, of the chromium dioxide dispersions (curves 1, A and B), the dispersion prepared in accordance with the invention, using zinc oleate (curve 1) has a very low viscosity, which decreases on storage (curve A = dispersion of Comparative Experiment A: Chromium dioxide/sodium oleate; curve B = dispersion of Comparative Experiment B: Chromium dioxide/soya lecithin; curve C = dispersion of Comparative Experiment C: Iron oxide/soya lecithin).

II. Influence of storage of the magnetic dispersions in the storage tank on the orientation ratio of magnetic coatings produced from the dispersions As indicated under I, samples of the dispersions are taken from the storage tanks immediately after their introduction and at intervals of 2 days, and magnetic coatings are produced from the samples by the same method in each case. For this purpose, the dispersions are applied by a conventional knife coater to 20μ thick polyethylene terephthalate base film, the coating thickness being such that after drying 6μ thick magnetic coatings result. Immediately downstream of the knife there is arranged a magnetic field which, whilst the mix is still fluid, orients the longitudinal axes of the magnetic particles in the coating plane and the playing direction. The magnetic coating is dried at approximately 60° C in a downstream drying zone. The orientation ratio of the magnetic coatings is determined by measuring the residual induction of the magnetic coating in the playing direction and in the crosswise direction in a field of about 2,000 oersteds.

FIG. 2 shows the orientation ratios of the various oriented magnetic coatings as a function of the storage time t, in days.

The curves are marked as described under I.

FIG. 2 shows that the magnetic coatings produced according to the invention from chromium dioxide magnetic dispersions with zinc oleate (curve 1) have the highest orientation ratio and that there is no decrease in the orientation factor even if the magnetic coatings are produced from magnetic dispersions which have been stored. The only other dispersion which shows the latter behavior is that of Comparative Experiment C (curve C) with gamma-iron(III) oxide as the magnetic pigment.

III. Influence of prolonged dispersion on the viscosity of the magnetic dispersion The behavior of the magnetic dispersions if the dispersing times are unusually long, the usual time being 3 to 8 days, is of interest in magnetic tape production, since for special purposes unusually long dispersing times are needed to produce a particularly smooth surface of the magnetic coating, and because the finished dispersion often cannot, for technical reasons, be transferred to an empty stirred vessel and must therefore remain in the ball mill. In order to ascertain the changes in viscosity of the magnetic dispersions according to Example 1 and Comparative Experiments A to C, the dispersions are left in the ball mill and dispersion is continued. At intervals of 2 days samples of the various dispersions are taken and their viscosities are measured. The results are shown in FIG. 3, where the viscosities (in centipoise) of the various dispersions are plotted as a function of the dispersing time $t$, in days, in the ball mill. It is found that, in comparison with the other dispersions, there is no significant change in viscosity in the chromium dioxide magnetic dispersion prepared according to the invention with zinc oleate. The curves are marked as described above under I.

Figure 4:
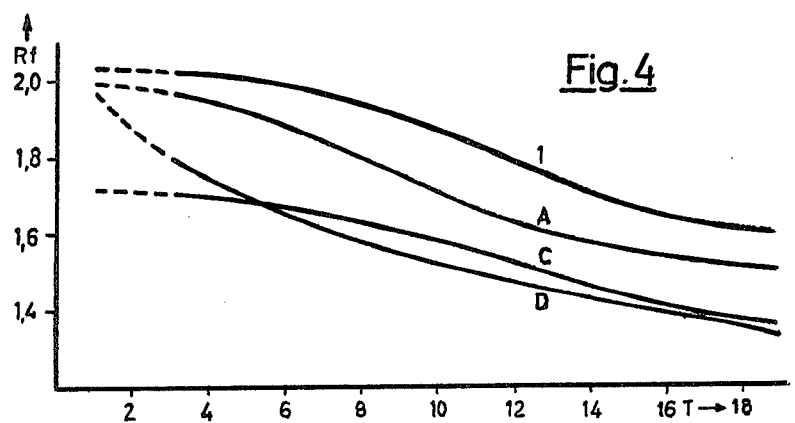

IV. Influence of prolonged dispersion of the magnetic dispersion in the ball mill on the orientation ratio of magnetic coatings produced therefrom As in III, samples of the various dispersions are taken from the ball mill at intervals of 2 days and magnetic coatings are produced therefrom as described under II. the orientation ratios of the coatings being determined. The results are shown in FIG. 4, in which the orientation ratios of the oriented magnetic coatings are plotted as a function of the dispersing time $t$, in days. It is found that the magnetic coatings prepared according to the invention (curve 1) have the highest orientation factors.

We claim:

1. A magnetic recording media having high orientation ratios which comprises:
   (a) a polyethylene terephthalate base film; and
   (b) a magnetic coating on said film, said magnetic coating consisting essentially of elongated ferromagnetic chromium dioxide particles dispersed in a synthetic, organic, polymeric binder, the amount of said binder being about 0.13 to 0.5 parts per part by weight of chromium dioxide, said binder further containing from 0.5 to 6% by weight based on the amount of chromium dioxide of zinc oleate.

2. A magnetic recording media as set forth in claim 1 wherein the amount of zinc oleate is from 1 to 3% by weight based on the weight of said chromium dioxide.

* * * * *